US008332930B2

(12) United States Patent
Burton et al.

(10) Patent No.: US 8,332,930 B2
(45) Date of Patent: Dec. 11, 2012

(54) SECURE USE OF USER SECRETS ON A COMPUTING PLATFORM

(75) Inventors: Wili Burton, Cheltenham (GB); Boris Balacheff, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 311 days.

(21) Appl. No.: 12/374,734

(22) PCT Filed: Jul. 17, 2007

(86) PCT No.: PCT/GB2007/050411

§ 371 (c)(1), (2), (4) Date: Sep. 22, 2009

(87) PCT Pub. No.: WO2008/012567

PCT Pub. Date: Jan. 31, 2008

(65) Prior Publication Data

US 2010/0011219 A1 Jan. 14, 2010

(30) Foreign Application Priority Data

Jul. 28, 2006 (GB) .................................. 0615015.5

(51) Int. Cl.
*G06F 12/14* (2006.01)
*G06F 21/00* (2006.01)
*G06F 15/16* (2006.01)
*H04L 29/06* (2006.01)

(52) U.S. Cl. ............... 726/17; 726/4; 713/182; 709/229

(58) Field of Classification Search ........................ None
See application file for complete search history.

(56) References Cited

U.S. PATENT DOCUMENTS 5,621,912 A * 4/1997 Borruso et al. .................. 718/1
(Continued)

FOREIGN PATENT DOCUMENTS

EP 1 055 989 A1 11/2000
(Continued)

OTHER PUBLICATIONS

PCT International Search Report in related co-pending PCT Application No. PCT/GB2007/050411, dated Sep. 9, 2007. GB Search Report in related co-pending GB Application No. 0615015.5, dated Oct. 19, 2006.

*Primary Examiner* — Nathan Flynn
*Assistant Examiner* — Trang Doan
(74) *Attorney, Agent, or Firm* — Richard A. Lawrence

(57) ABSTRACT

A computing platform (20) is adapted for secure use of trusted user input. The computing platform (20) comprises a user input device (14), a first isolated operating environment (21) for execution of applications requiring use of trusted user input, a second isolated operating environment (22) adapted for secure processing of information relating to a user, and a third isolated operating environment (23) adapted for secure communication with the user input device (14). In this computing platform, no isolated operating environment can communicate with another isolated operating environment other than by a secure path (26, 27) therebetween. When an application executing in the first isolated operating environment requires provision of trusted user input, the user provides user input through the user input device (14) to the third isolated operating environment (23). The user input is then provided to the second isolated operating environment (22), and the second isolated operating environment (22) provides a service relating to the trusted user input as required by the application executing in the first operating environment (21).

19 Claims, 8 Drawing Sheets

U.S. PATENT DOCUMENTS

| | | | | |
|---|---|---|---|---|
| 2003/0163711 | A1 | 8/2003 | Grawrock | |
| 2004/0268135 | A1* | 12/2004 | Zimmer et al. | 713/189 |
| 2005/0044408 | A1 | 2/2005 | Bajikar et al. | |
| 2005/0091530 | A1* | 4/2005 | Avraham et al. | 713/201 |
| 2005/0133582 | A1* | 6/2005 | Bajikar | 235/10 |
| 2005/0188210 | A1 | 8/2005 | Perlin et al. | |
| 2005/0223221 | A1 | 10/2005 | Proudler et al. | |
| 2005/0240998 | A1 | 10/2005 | Cromer et al. | |

FOREIGN PATENT DOCUMENTS

| | | | |
|---|---|---|---|
| EP | 1 056 014 | A1 | 11/2000 |
| EP | 1 632 838 | A2 | 3/2006 |
| GB | 2 376 764 | A | 12/2002 |
| WO | 00 48062 | | 8/2000 |
| WO | 03 003170 | A1 | 1/2003 |

* cited by examiner

SECURE USE OF USER SECRETS ON A COMPUTING PLATFORM

FIELD OF THE INVENTION

The present invention relates to methods and apparatus for secure use of user secrets on a computing platform.

BACKGROUND

Computer platforms typically operate in an environment where their behaviour is vulnerable to modification by local or remote entities. This is particularly true of computer platforms used for a function that requires regular interaction with third parties, including third parties about whom the user knows little or nothing. Such modification may result in unreliable performance or data loss, but a potentially greater risk is that of misappropriation of user secrets. Downloading of malicious code may result in exposure of user secrets stored on a computer platform, or to the capture of user secrets (by processes such as key logging) such as passwords entered by user's in response to local or remote prompts. Existing approaches to maintaining security of user input are either reliant on significant specialised hardware used for highly secure processing or are vulnerable to modification of the computing environment. It is therefore desirable to seek an approach to use of user secrets on a relatively conventional computer platform which provides some promise of security.

SUMMARY OF THE INVENTION

In accordance with the present invention there is provided a computing platform adapted for secure use of trusted user input, comprising: a user input device; a first isolated operating environment for execution of applications requiring use of trusted user input; a second isolated operating environment adapted for secure processing of information relating to a user; a third isolated operating environment adapted for secure communication with the user input device wherein no isolated operating environment can communicate with another isolated operating environment other than by a secure path therebetween, and when an application executing in the first isolated operating environment requires provision of trusted user input, the user provides user input through the user input device to the third isolated operating environment, the user input is provided to the second isolated operating environment, and the second isolated operating environment provides a service relating to the trusted user input as required by the application executing in the first operating environment.

BRIEF DESCRIPTION OF THE DRAWINGS

By way of example, specific embodiments of the present invention are described below with reference to the accompanying drawings, of which.

SPECIFIC DESCRIPTION OF EMBODIMENTS OF THE INVENTION

Figure 1:
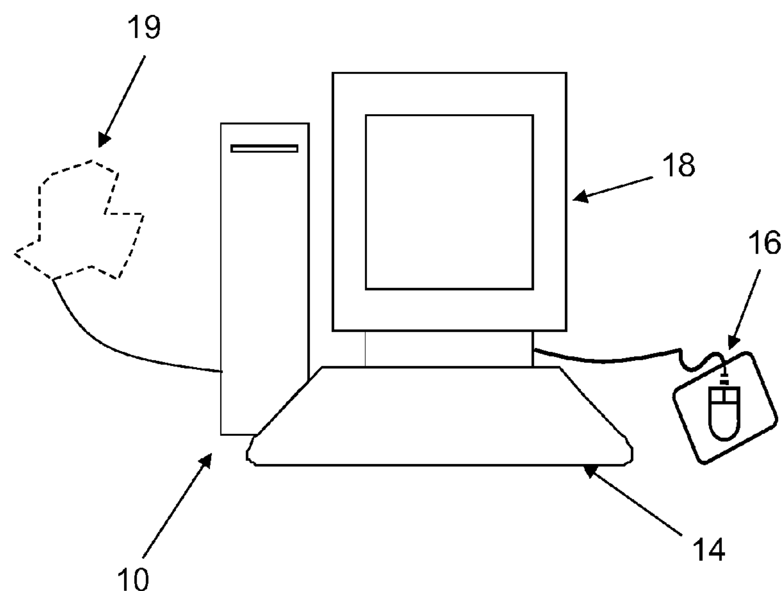
FIG. 1 illustrates physical elements of a conventional computing platform according to the prior art but suitable for use with embodiments of the invention.

FIG. 1 shows the physical elements of conventional computer apparatus (in which embodiments of the invention can be deployed). The computer apparatus comprises a computer platform 10 together with peripherals for user input and output, specifically a keyboard 14, a mouse 16 and a display 18. Also shown is a network 19 for which the computer platform 10 has a network connection (through a network interface card—not shown)—as will be described below, embodiments of the invention can be used effectively in secure user interaction with services which can be accessed through network 19. Computer platform 10 contains at least a main processor and a main memory (not shown)—as is indicated below, in embodiments of the invention additional processors and memories are used, whereas in other embodiments of the invention the main processor and main memory are used for a plurality of computing environments.

Figure 2:
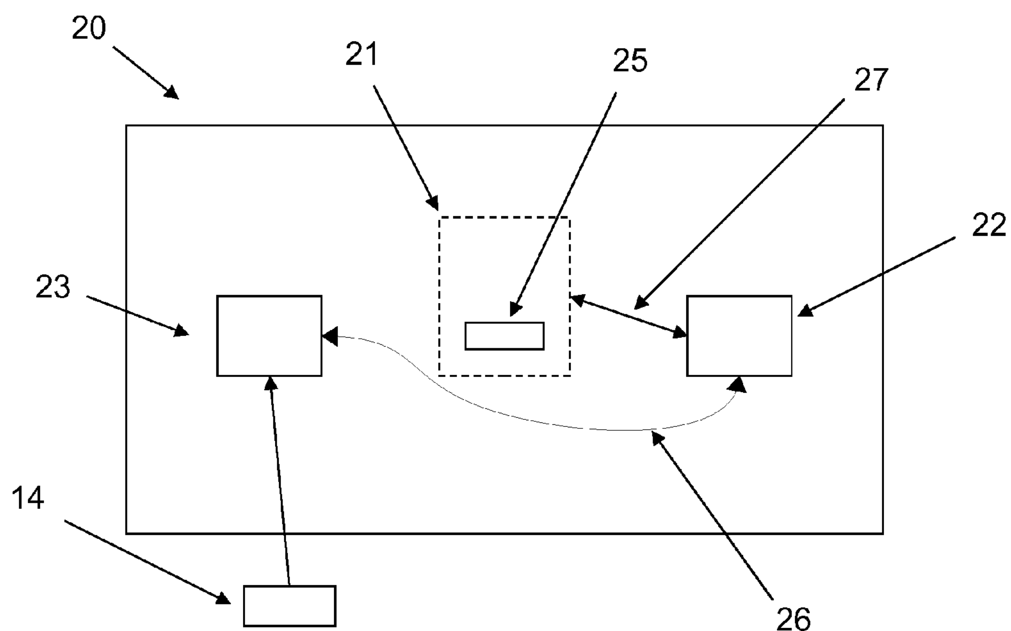
FIG. 2 illustrates functional elements of a computing platform according to a first embodiment of the invention.

FIG. 2 illustrates functional elements of a computing platform according to a first embodiment of the invention. Computing platform 20 contains three computing environments, referred to below as components. Two of these components are isolated and are connected to other elements (including other components) only by secure paths. These components are discussed below.

A first component 21 (shown with a dashed boundary—this is to indicate that this component either can be a discrete component similar to the other components, or can form essentially all the computing environment other than specifically isolated components such as the second and third components described below) is described here as the General Purpose Component (or GPC). This component represents—and may comprise—a traditional operating system and the associated computing environment. This is where the user executes applications. A role of this component in embodiments of the invention is to alert the second component 22 when use of a user secret is required. In embodiments of the invention (as described below), the GPC 21 is an isolated environment of the same form as the other components described below.

A second component 22 is described here as the Isolated Component with Secrets (ICS). This component is adapted to contain—and process—any secrets that the user (or any other relevant data owner) wishes to secure from any code running in the GPC 21. This is desirable whatever the code in the GPC 21 (even if it is purely user code), but particularly so as the role of the GPC 21 creates a significant additional risk that the GPC 21 contains unwanted and even harmful code such as viruses, malware and spyware.

A third component 23 is described here as the Input Isolated Component (IIC). This component is adapted to control all input from the device which is intended to provide the trusted input (in this case, keyboard 14). The IIC 23 is adapted to decide where to send trusted input—this will in practice depend on which ICS 22 the application in the GPC 21 has requested to be the recipient of trusted input.

It should be noted that there may be a plurality of ICS components 22—individual applications on the GPC 21 may have an associated ICS 22.

There may be a plurality of each kind of component within a computer platform 20 in appropriate circumstances (for example, there may be a plurality of IIC components 23 each associated with a different physical trusted input device—a biometric sensor or a smart card interface may usefully be provided with an IIC component 23 of its own).

The GPC 21 contains an operating system and also an application associated with use of user secrets—this application is described here as a Switch Signalling Application (SSA) 25. The SSA 25 runs within the GPC, and becomes active when a user secret needs to be used. When it is determined that secure input to an ICS 22 is needed, the SSA 25 sends a message to the IIC 23 to indicate that trusted input should be passed to that particular ICS 22.

Figure 3:
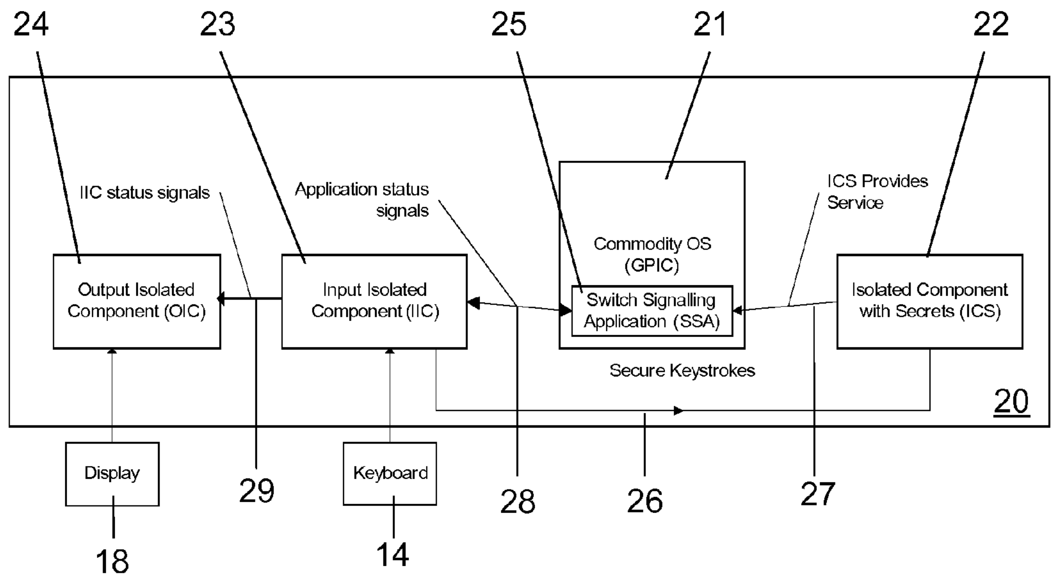
FIG. 3 illustrates functional elements of a computing platform according to a second embodiment of the invention.

FIG. 3 shows a second embodiment of the invention which includes a fourth component 24. The computer platform 20 of this embodiment employs a GPC 21, an ICS 22 and an IIC 23 in the same manner as for the first embodiment, but has in addition a fourth component described here as an Output Isolated Component (OIC) 24. The OIC 24 provides control of output to the user—this output informing the user where their secret-related input is currently going. In the present case, the OIC 24 controls output to the display 18. This fourth component 24 provides an advantage for the user—it enables the user better to trust the computer platform 20 with which the user is interacting, and in particular to provide reassurance that the input is not being spoofed (and used by malicious software to utilise their secrets). However, it should be noted that the first embodiment of the invention also provides a defence against spoofing, in that even should secrets be stolen from user input, they cannot be used in this model of secrets use without this use being at a trusted IIC 23 possessing the secrets. In either embodiment, the ICS 22 will not reveal secrets to an IIC 23 if it cannot establish a satisfactory trust relationship with that IIC 23.

Each of the four components identified may be a discrete physical component, and any trusted path between a pair of these components may be a discrete physical path. However, as will be described below with reference to further embodiments, alternative arrangements may provide logical isolation and logical trusted paths which do not require physical isolation.

A general approach to operation of these components (applicable to both the FIG. 2 and FIG. 3 embodiments) will now be described. A default state for each of the components is such that the computer platform according to embodiments of the invention mirrors that of a conventional computer platform—in other words, when a user needs to provide general user input, this is received by the IIC 23 and passed directly on to GPC 21 and the relevant application running within it. This behaviour continues until a user secret is required—for example, user authentication is required. The relevant user secret is held in ICS 22. In the application running in the GPC 21, this situation may be reflected by creation of a password entry box in the GPC 21—recognising that a user secret is required, the GPC 21 sends a message to the IIC 23 indicating that it wants to receive a list of available ICS components 22. The IIC 23 interrogates each ICS 22 of which is the IIC 23 is aware, asking whether that ICS 22 wishes to reveal itself to the GPC 21 (or wishes to identify itself as prepared to participate for the indicated purpose). Under many circumstances, an ICS 22 will be able to make an informed decision about whether it wishes to make its existence known to the GPC 21—for example, if there is a method available to the ICS 22 of determining securely and reliably what the GPC 21 is being used for. For example, a GPC 21 created to act as a display for confidential material of one company may be detected by an ICS 22 adapted to hold confidential material of another company—the ICS 22 then may logically wish not to reveal its existence at all rather than reveal to the GPC 21 that confidential information of the other company was available if the correct password or other security criteria could be met. Any ICS 22 which replies positively is then listed to the GPC 21. The GPC 21 then selects a specific ICS 22 to provide the user secret function. When (in this example) the password entry box gains the focus for user input, the SSA 25 in the GPC 21 sends a message to the IIC 23 that input provided by the user is to be sent to the selected ICS 22. User input received by the IIC 23 is then sent over the secure path 26 to the selected ICS 22. A predefined signal (such as pressing the Enter key) can be used to indicate when this input—which can be considered to be trusted input from the user to the ICS 22—is complete. It should be noted that alternative approaches to indicating completion of trusted input—such as clicking a "Done" button for the application running in the GPC 21, or otherwise using a mechanism which does not involve interpretation of input received through the IIC 23—may require appropriate communication between the GPC 21 and the IIC 23.

When the selected ICS 22 has received the complete trusted user input, it can then perform the appropriate process to determine what to provide to the application running in the GPC 21. This process may be simply allowing the application to proceed if appropriate input is received—for example, the user enters a password, the ICS 22 matches the password in the trusted user input against a list of legitimate user passwords, and provides confirmation to the application running in the GPC 21 that the application is being run by a legitimate user. Alternatively, the ICS 22 may provide input to the application running in the GPC 21 that depends on the trusted input provided by the user—for a first example, the situation may be in the previous example, but the legitimate user passwords may be provided not in a list but in a table with associated data, and the associated data (user name or user credentials, for example) may be what is provided to the user; for a second example, the user input may be a key, and the output provided to the application being encrypted content in the ICS 22 as decrypted (whether or not successfully) by the key). A still further alternative is for some other kind of service to be performed by the ICS 22, such as establishment of a secure communication channel with a third party for use by the GPC 21.

The options in the previous paragraph all relate to the trusted user input having a security function (provision by the user of a password or other credential). Another purpose of this arrangement may also be to ensure that input to an application running in the GPC 21 is input from the user physically present at the machine. A further possibility is that such genuine user input may not be provided directly to the application running in the GPC 21, but may be provided directly to a remote service by the ICS 22—the trust relationship between the ICS 22 and the remote service being such that the remote service is assured that the input provided is genuine input from the user physically present at the machine. In many practical uses of such technology, initial user input will be provision of secrets or credentials to authenticate the user to the ICS 22, and later user input will be used by the application or in interaction with a remote service to produce the desired outcome for the user. However, this is not inevitably the case—for example, the ICS 22 may not in certain arrangements require user authentication, and all user input may be simply provided to an application or remote service as confirmed to be received through the trusted user input function of the platform (rather than as being necessarily provided by any specific user).

As indicated above, different components may be provided as discrete physical components. One effective exemplary way to do this is to use Trusted Computing technology, and in particular for relevant components (or all components) to be provided as Trusted Platform Modules (discussed below as trusted devices). It should be noted, however, that some embodiments of the invention do not require any components with full Trusted Platform Module functionality, as is discussed further below. Trusted Computing technology is described in specifications provided by the Trusted Computing Group (TCG) and aspects of Trusted Computing technology are described more fully in, for example, “Trusted Computing Platforms—TCPA Technology in Context”, edited by Siani Pearson, 2003, Prentice Hall PTR. Trusted devices in Trusted Computing technology are components resistant to subversion which have both processing capability and memory. Typically these are provided as discrete physical components (typically a tamper-resistant integrated circuit chip) provided on the motherboard of a computing platform, with a primary function of providing trustworthy measurements of the state of the associated computing platform to indicate whether the computing platform can be considered trustworthy by computing entities and processes (hence “trusted platform module”). Such measurements are termed integrity metrics—features of trusted devices and aspects of measurement of integrity metrics are described in more detail below.

Figure 4:
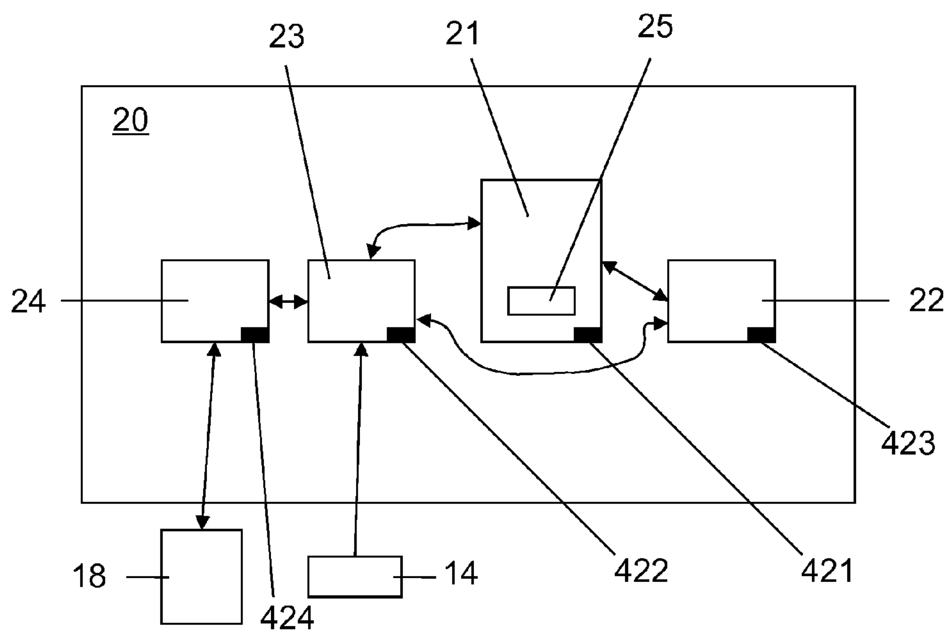
FIG. 4 illustrates functional elements of a computing platform according to a third embodiment of the invention.

FIG. 4 shows a third embodiment of the invention using trusted devices as described above. The second, third and fourth components are each provided essentially in the form of trusted devices: ICS trusted device 422; IIC trusted device 423 and OIC trusted device 424. Each such trusted device is adapted to have either physical or logical secure paths to relevant components (the display for OIC trusted device 424, the keyboard for IIC trusted device 423). The complexity of the tasks performed by the second, third and fourth components is sufficiently low that it is reasonable for these tasks to be carried out by a TCG-type trusted device. The tasks to be performed by the first component, the GPC 21, are more complex—this component provides essentially the normal operating environment of a computing platform. This environment is provided in this embodiment essentially in the same manner as a conventional trusted computing platform—it contains a trusted device 421 acting as a trusted platform module and acting to measure integrity metrics of the GPC 21 and to confirm to other parties (including, here, the ICS trusted device 422, the IIC trusted device 423 and the OIC trusted device 424) that the GPC 21 is operating as intended. It should be noted that effective arrangements can still be achieved even if only some of the components are provided as TCG-type trusted devices and that embodiments of the invention do not necessarily require full TCG functionality from any component. A benefit will be provided by using a TCG-type trusted device where it is desirable for the trusted device to be able to report on itself or its environment to another computing entity in a trusted manner. Where reporting is not required, it may be sufficient to provide a component which is protected (physically, logically, or both) against unauthorised modification, but which does not itself have all the features of a TCG-type trusted device.

Figure 5:
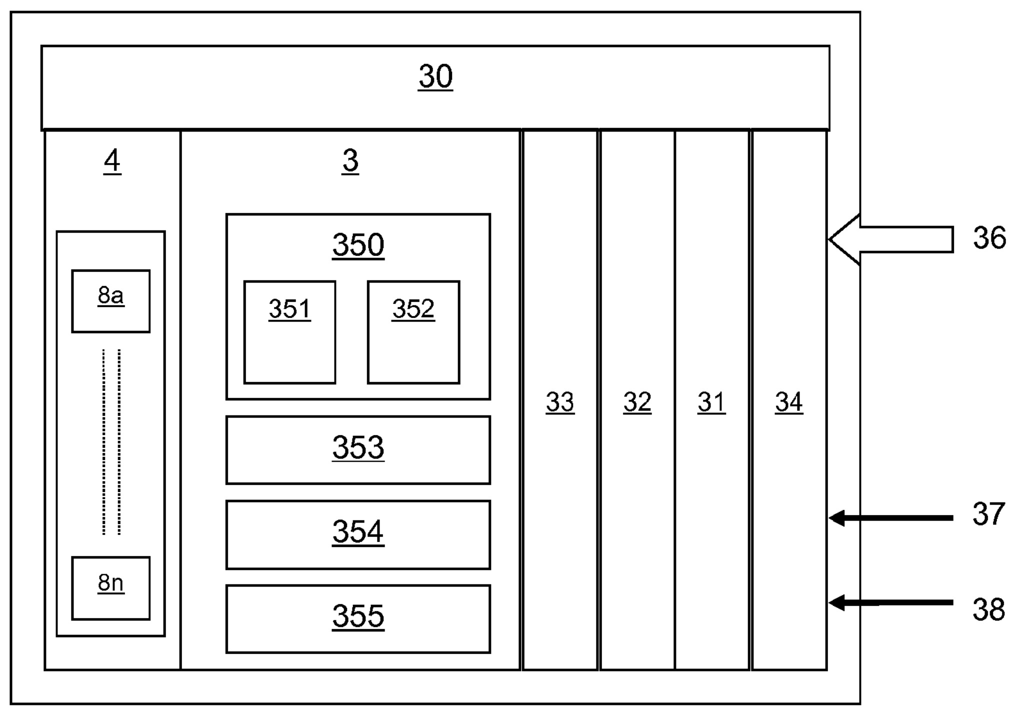
FIG. 5 illustrates a trusted platform module according to the prior art but suitable for use with embodiments of the invention as shown in FIG. 4.
Figure 6:
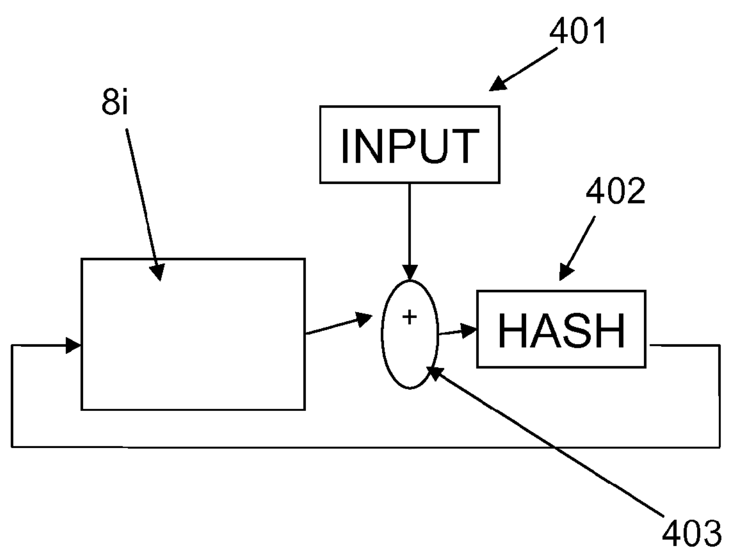
FIG. 6 illustrates a process for updating platform configuration registers of a trusted platform module, the process being according to the prior art but suitable for use with embodiments of the invention.

Structure and operation of a trusted device will now be described with reference to FIGS. 5 and 6—as indicated above, further discussion of practical implementations of a trusted device is provided in the references indicated above. A trusted device can be treated as comprising a number of blocks, as illustrated in FIG. 5. For a trusted device used as a conventional trusted platform module (for which the term “trusted platform module device” will be used below), after system reset, the trusted platform module device performs an authenticated boot process to ensure that the operating state of the associated platform is recorded in a secure manner. During the authenticated boot process, the trusted platform module device acquires an integrity metric (or a number of integrity metrics) of the computing platform. Such a trusted device can also perform other functions, such as secure data transfer and, for example, authentication between it and a smart card via encryption/decryption and signature/verification. The trusted platform module device can also securely enforce various security control policies, such as locking of the user interface.

Specifically, the trusted device shown in FIG. 5 is adapted as a trusted platform module device and comprises: a controller 30 programmed to control the overall operation of the trusted device, and interact with the other functions on the trusted device and with the other devices on the motherboard of the computing platform; a measurement function 31 for acquiring a first integrity metric from the platform either via direct measurement or alternatively indirectly via executable instructions to be executed on the platform’s main processor; a cryptographic function 32 for signing, encrypting or decrypting specified data; an authentication function 33 for authenticating a smart card; and interface circuitry 34 having appropriate ports (36, 37 & 38) for connecting the trusted platform module device respectively to the data bus, control lines and address lines of the motherboard. Each of the blocks in the trusted device has access (typically via the controller) to appropriate volatile memory areas 4 and/or non-volatile memory areas 3 of the trusted device. Additionally, the trusted device is designed, in a known manner, to be tamper resistant. For a trusted device configured for use as one of the specific components used in embodiments of the invention, the functions 31-34 may vary: measurement function 31 may not relate to a computing platform, but rather to code within the trusted device itself or relating to an associated peripheral (for example the display, for the OIC trusted device 424 of FIG. 4); cryptographic function 32 will typically still be required, authentication function 33 may not be required; whereas interface circuitry 34 may not be required (if there are dedicated connections to the trusted device) or may be much simpler than indicated in FIG. 5.

For reasons of performance, a trusted device may be implemented as an application specific integrated circuit (ASIC). However, for flexibility, the trusted device is preferably an appropriately programmed micro-controller. Both ASICs and micro-controllers are well known in the art of microelectronics and will not be considered herein in any further detail.

One item of data stored in the non-volatile memory 3 of the trusted platform module device is a certificate 350. The certificate 350 contains at least a public key 351 of the trusted device and an authenticated value 352 of the platform integrity metric measured by a trusted party (TP)—for a different form of trusted device, this integrity metric may not be of the platform, but instead appropriate to the trusted device function (as indicated above for the associated measurement function). The certificate 350 is signed by the TP using the TP's private key prior to it being stored in the trusted device. In later communications sessions, a user of the platform can deduce that the public key belongs to a trusted device by verifying the TP's signature on the certificate. Also (for a trusted platform module device), a user of the platform can verify the integrity of the platform by comparing the acquired integrity metric with the authentic integrity metric 352. If there is a match, the user can be confident that the platform has not been subverted. Knowledge of the TP's generally-available public key enables simple verification of the certificate 350. The non-volatile memory 3 also contains an identity (ID) label 353. The ID label 353 is a conventional ID label, for example, a serial number, that is unique within some context. The ID label 353 is generally used for indexing and labeling of data relevant to the trusted device, but is insufficient in itself to prove the identity of the platform 10 under trusted conditions.

The trusted device is equipped with at least one method of reliably measuring or acquiring an integrity metric (for a trusted computing platform device, this is of the computing platform with which it is associated). For a conventional trusted platform module, a first integrity metric may be acquired by the measurement function 31 in a process involving the generation of a digest of the BIOS instructions in the BIOS memory. Such an acquired integrity metric, if verified as described above, gives a potential user of the platform a high level of confidence that the platform has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device, and volatile memory 4 for storing acquired integrity metrics. A trusted device has limited memory, yet it may be desirable to store information relating to a large number of integrity metric measurements. This is done in trusted computing platforms as described by the Trusted Computing Group by the use of Platform Configuration Registers (PCRs) 8*a*-8*n*. The trusted device has a number of PCRs of fixed size (the same size as a digest)—on initialisation of the platform, these are set to a fixed initial value. Integrity metrics are then "extended" into PCRs by a process shown in FIG. 6. The PCR 8*i* value is concatenated 403 with the input 401 which is the value of the integrity metric to be extended into the PCR. The concatenation is then hashed 402 to form a new 160 bit value. This hash is fed back into the PCR to form its new value. In addition to the extension of the integrity metric into the PCR, to provide a clear history of measurements carried out the measurement process may also be recorded in a conventional log file (which may be simply in main memory of the computer platform). For trust purposes, however, it is the PCR value that will be relied on and not the software log.

While such an arrangement as shown in FIG. 4 is effective to implement the invention, it does require specialised hardware in the computing platform. It may be advantageous to adopt an approach that uses software to achieve the desired separation of environments logically rather than physically. This can be done by using virtualisation to create a plurality of separate virtual machines—individual components of those shown in the arrangements of FIGS. 2 and 3 could be provided by individual virtual machines. Operating systems may also provide for existence of compartments which are isolated or connectable to other compartments only by controlled paths. Conventional technologies of this type can provide arrangements comparable to those of FIGS. 2 and 3 (secure paths may be provided, for example, by having encryption processes running in each virtual machine or compartment, and with communications along the secure path being appropriately encrypted).

Figure 7:
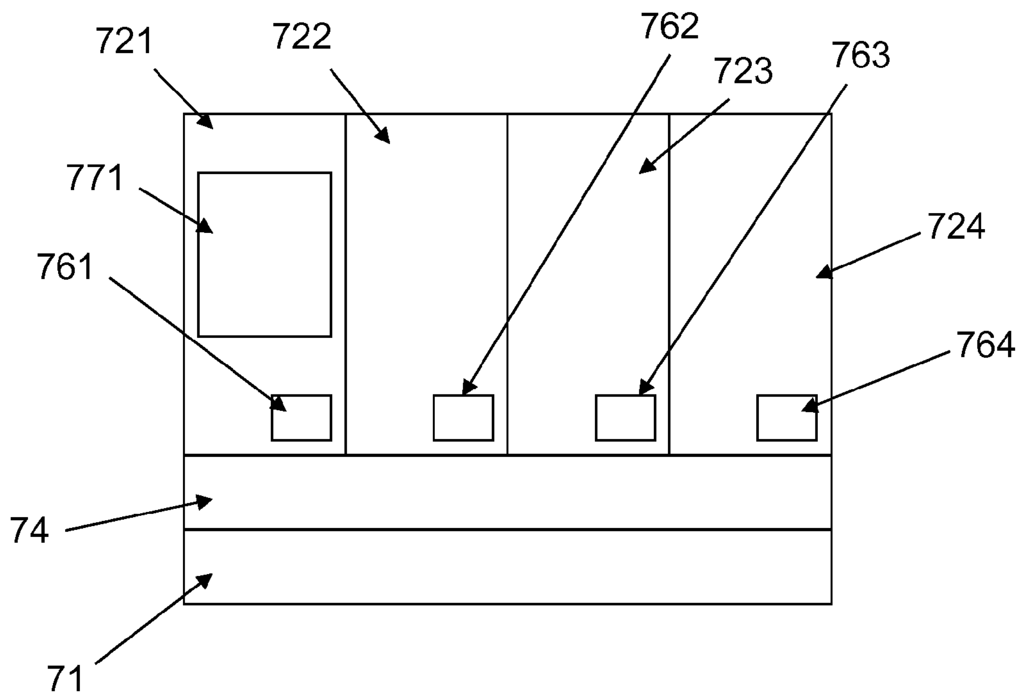
FIG. 7 illustrates functional elements of a computing platform according to a fourth embodiment of the invention.

A fourth embodiment of the invention of this type, using virtualisation technology, is shown in FIG. 7. The virtualisation approach depicted involves rewriting the operating systems running on top of the control layer so that they do not contain any privileged or sensitive instructions that would not naturally cause a transition to the control layer. "Para-virtualization" is the term used to describe such source code rewrites of the operating systems. The Xen virtual machine monitor relies on this approach. VMWare uses dynamic binary modification of the running operating systems as its means of remaining in control of the real hardware platform. In a composite approach, both Intel (Virtualization Technology, or VT) and AMD (Secure Virtual Machine, or SVM) have developed hardware features in CPUs to support the running of virtual machine monitors. With this support any instruction, regardless of privilege level, can be made to trigger a transition to the control layer. It will be appreciated by the person skilled in the art that other approaches to virtualisation, such as use of multiple processor privilege levels, can also be employed.

Computing platform 20 comprises hardware 71. This hardware 71 supports a virtual machine monitor (VMM) 74—this is the virtualization layer which controls virtualization. On top of this the components identified in respect of FIG. 3 are provided as separate virtual machines: a first compartment 721 comprises a GPC component and provides a main application environment and hence contains an operating system 761 as well as a plurality of applications 771; a second compartment 722 comprises an ICS component 762; a third component 723 comprises an IIC component 763; and a fourth component 724 comprises an OIC component 764. Isolation is provided by the virtualization layer 74—as indicated above, approaches such as use of cryptographic processes in individual compartments may be used to provide secure paths between components (with appropriate monitoring or control from the VMM 74).

Virtualisation technology may be used together with Trusted Computing technology to provide a fifth embodiment of the invention. US 2005/0223221 describes the use of virtualisation technology in a computing platform with a trusted platform module to provide a plurality of computing environments with trust routines with trust rooted in the trusted platform module—such trust routines effectively act as virtual trusted devices for the computing environments. Again, a para-virtualisation approach is described here, but as the skilled person will appreciate, alternative approaches to virtualisation may be employed (for example, by carrying out trust routine functions in a processor privilege level that restricts access to other software applications being executed on the computer platform in an arrangement with multiple processor privilege levels).

Figure 8:
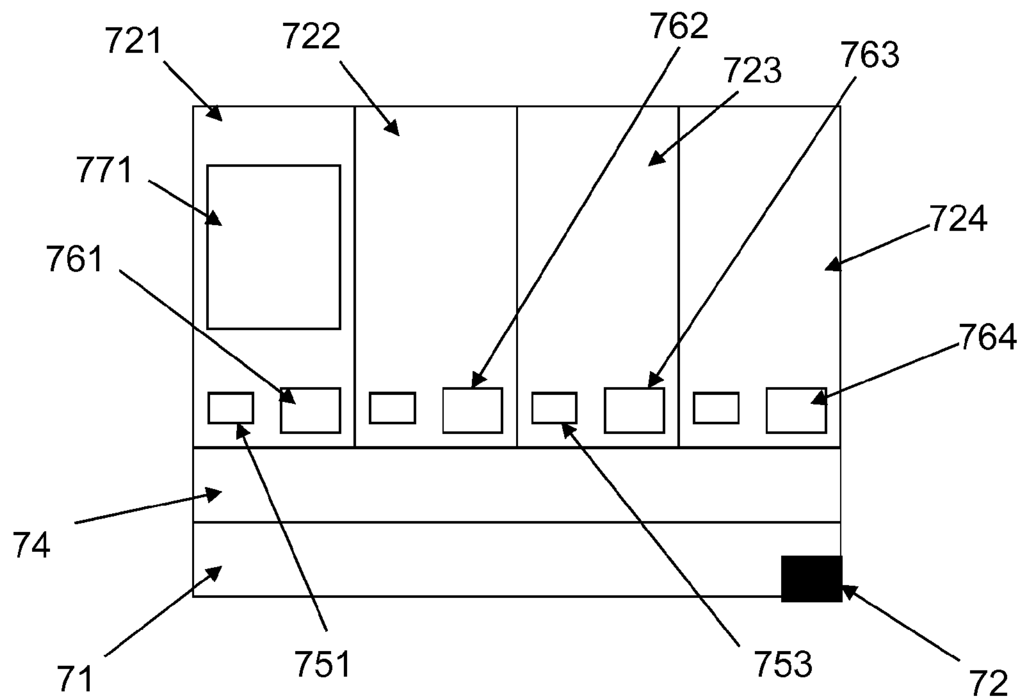
FIG. 8 illustrates functional elements of a computing platform according to a fifth embodiment of the invention.

Such an arrangement is shown in FIG. 8. Elements are as for the FIG. 7 arrangement, but the hardware 71 now additionally comprises a physical trusted device 72 as trusted platform module. The isolation of any virtual component—and hence trust routines acting as virtual trusted devices—is achieved by the virtualisation layer 74. Such an arrangement, with a physical trusted device in the hardware, and virtual trusted devices sitting over the virtualisation layer along with associated operating environments, is not reliant on the virtualisation technology used.

In other respects, the principles of virtualisation and of Trusted Platform technology indicated above can simply be applied. The computing platform may therefore employ any processor suitable for use with a virtualisation technology, rather than specifically one with multiple privilege levels. Integrity metrics are obtained in the manner briefly discussed above and set out more fully in TCG technical specification—the measurement process for such metrics is not reliant on the form of virtualisation technology as described (although relevant aspects of the virtualisation technology may be measured by integrity metrics). The measurement of integrity metrics in accordance with TCG practice is also described more fully in, for example, "Trusted Computing Platforms—TCPA Technology in Context", edited by Siani Pearson, 2003, Prentice Hall PTR.

It should be noted that while a trusted device—and similarly trusted routines—are each described above as a single entity, more properly in TCG specifications these should be considered—rather than as a single trusted device—as multiple entities. The measurement engine which makes the first measurement within the trusted platform is termed the Root of Trust for Measurement (RTM)—this, in addition to the TPM, serves as a root of trust, generally achieved by a trusted source of such software vouching for it. A Core Root of Trust for Measurement (CRTM) comprises executable instructions that, when controlling the main processing engine on the platform, cause the platform to perform the functions of an RTM. The Trusted Platform Module (TPM) is an engine that that stores and reports measurements loaded into it by the RTM and subsequent measurement agents. The Trusted Building Block (TBB) comprises the CRTM and the connections between the CRTM, the TPM and the platform (including the platform's main processing engine). The Trusted Platform Module is, for the physical platform, comprised in a physical device. US 2005/0223221 describes in more detail how trust routines providing these elements in a virtualized form with respect to the relationships between a trust routine and the operating environment to which it relates can be related to the trusted elements of the physical platform itself—while the attention of the skilled person is drawn to this teaching, the analysis provided is not itself necessary for understanding of the present invention, and is not reproduced here.

The FIG. 8 arrangement has advantages as each isolated environment can readily be configured to have the resources that it needs for its function without hardware constraints. Other possibilities become available through use of virtualisation—for example, the secure and reliable identification by an ICS of what a GPC is being used for (discussed above in relation to the FIG. 3 embodiment) may be facilitated by labelling of the virtualisation layer when it is created with any of its provenance, purpose and capabilities. The use of trust routines acting as virtual trusted devices means that components can provide and attest measurements of their own state to enable them to be trusted by other components, trust being rooted in the hardware trusted device and the root of trust for measurement for the computing platform.

An example of a method of use of user secrets according to aspects of the invention will now be described with reference to FIGS. 9 and 10. The example relates to authentication for online banking—however, the skilled person will readily appreciate that it can be modified not only for other online service provision but also for other uses of a user secret. This method will be described with respect to the computing platform of FIG. 8, though it will be appreciated that an appropriate computing platform according to any other embodiment of the invention could also be used.

Figure 9:
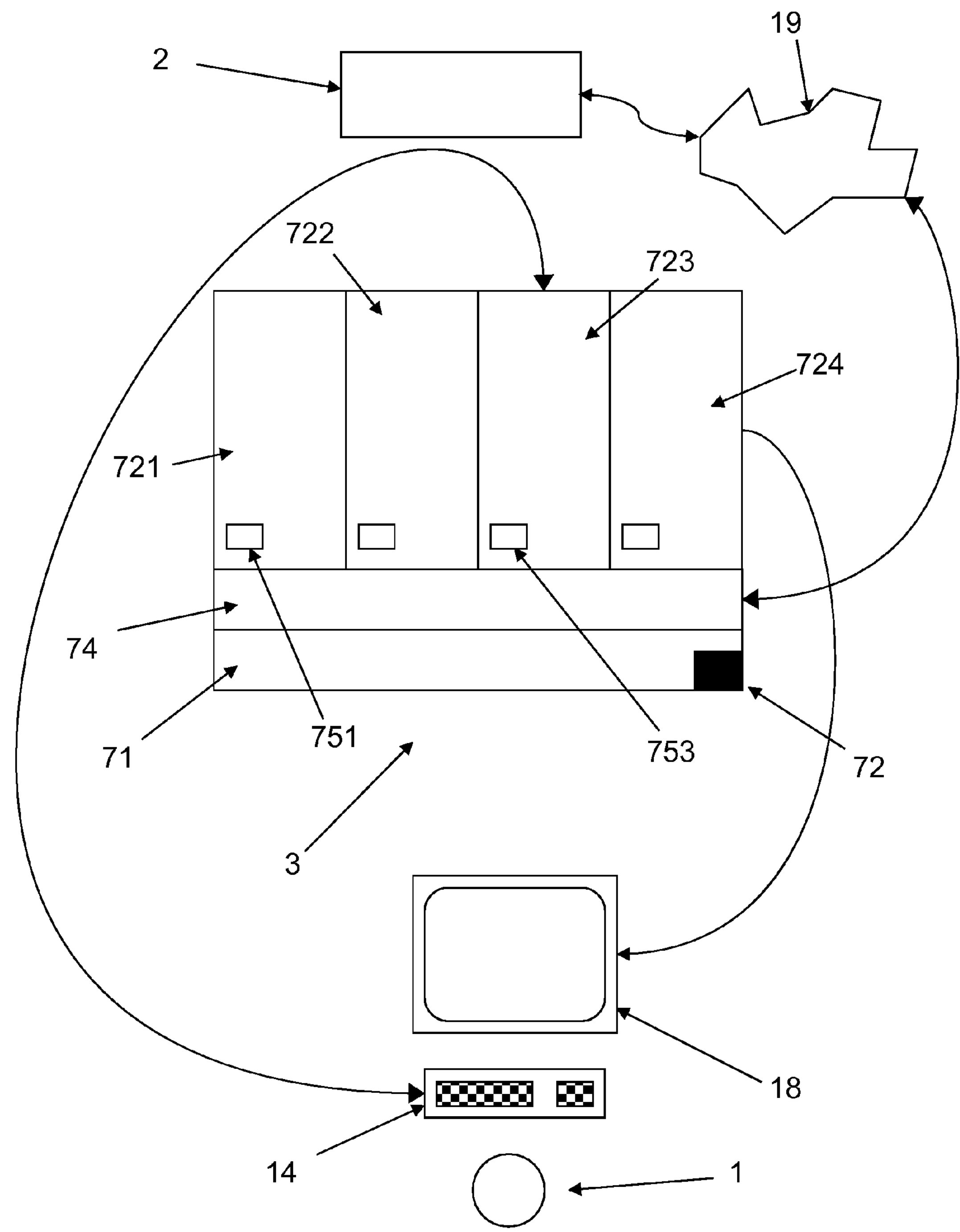
FIG. 9 illustrates entities interacting in the performance of a method of a use of user secrets according to embodiments of the invention.
Figure 10A:
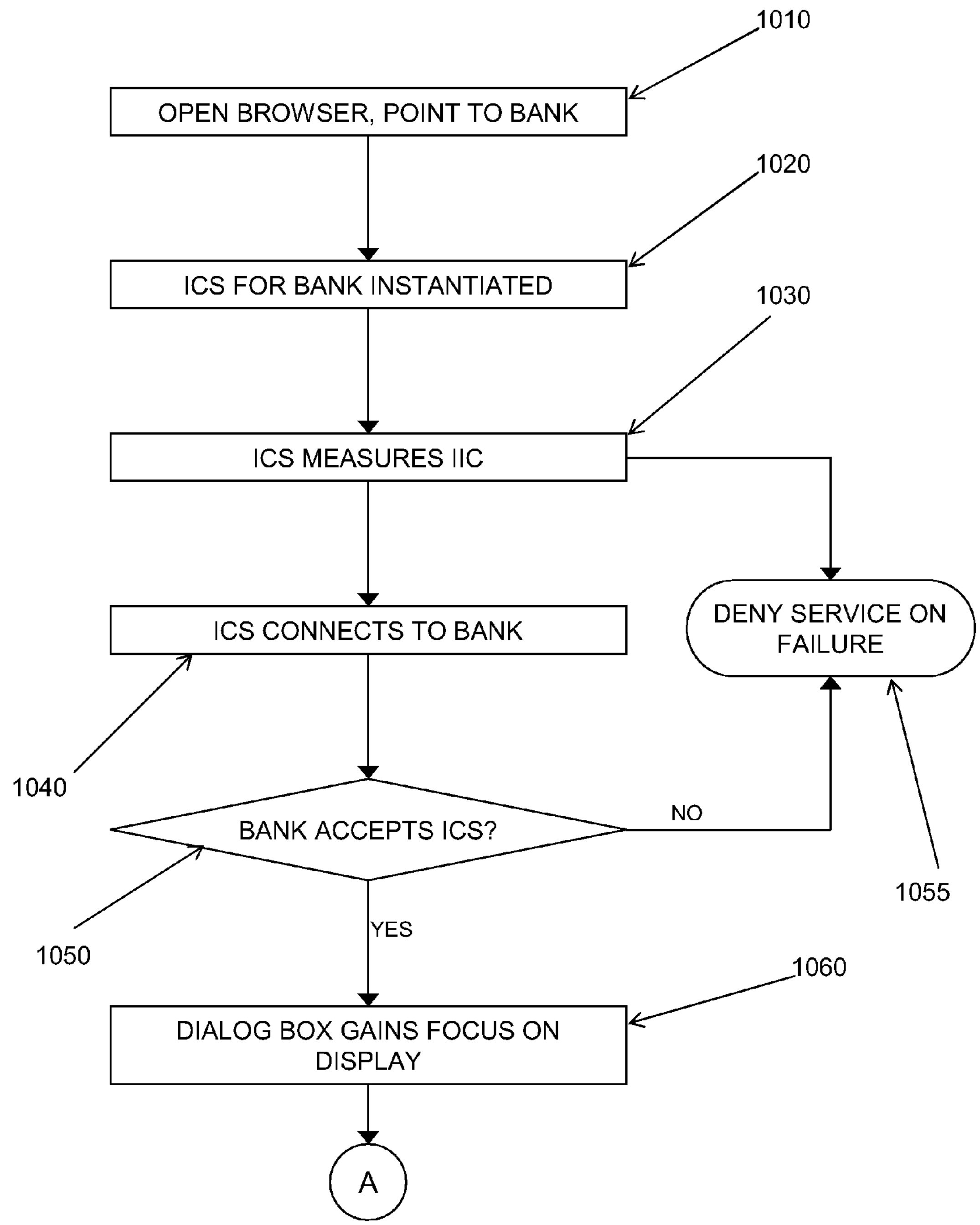
FIGS. 10A, 10B and 10C illustrate steps employed in banking interactions using a method of use of user secrets according to embodiments of the invention.

FIG. 9 shows the computing platform and the other entities involved in the example to be described. There are three main entities: the user 1, the bank 2, and the computing platform 3. However, as indicated above, the computing platform can be considered to comprise at least three entities: the GPC 721, the ICS 722, the IIC 723, and in this case the OIC 724. In this case the entire virtual machine is just indicated to be the relevant component, whereas in the FIG. 7 and FIG. 8 case the component was shown to be only one element within its virtual machine—either arrangement is possible, and the difference between these arrangements is primarily representational rather than functional. The user 1 interacts through the keyboard 14 (and hence through and with the IIC 723) and through the display 18 (and hence through and with the OIC 724). The bank 2 (in the form of a bank server) interacts through a network 19 (typically comprising conventional telecommunications network) with the computing platform 3. Communication at the computer platform is handled by a component adapted to multiplex communication streams (such as IP streams) to different components—this communication component is in practice provided along with the VMM as part of the trusted code base of the platform and can be considered a part of the VMM for practical purposes. As will be described, both the ICS 722 and the GPC 721 use the connection to the bank 2 in the exemplary process described.

In this example, the objective of the user is to connect to his bank to conduct a banking transaction. His first step is to start 1010 the relevant application in the GPC, for example by opening a browser window and pointing to the bank website. The next step is for the ICS 722 for the bank to be instantiated 1020 on the computing platform 3. The ICS 722 is provided with the user's authentication information protected by the user's password. Alternative possibilities are available for the instantiation of the ICS 722. This could occur at startup—however, it is to be expected that different tasks will require a different ICS, and that it would be inefficient for a user to launch every single ICS that he may later need at startup. If instantiation is only to take place while a task is running, there needs to be an appropriate mechanism to bring it about—here, that may be a procedure for the bank (or other remote entity) to ask for the ICS to be run to hold the secrets, and a new virtual machine (or compartment, or guest—depending on the operating model for the platform) to be created in response at the platform. Provision of the user's authentication information to the instantiated ICS 722 may also be accomplished in a variety of ways. One approach would be for it to be held locally on the platform in encrypted form, with the key to release the authentication information only being released to certain measurable environments—such as the bank ICS 722—when the user's authentication information has been input correctly (such as by the mechanism described here). The mechanism used may be the same or similar to that used for the "unsealing" of data according to the Trusted Computing Group specifications.

The skilled person will however appreciate that other models of storage of secret-related information for access by secure applications are available and may also be employed in this case.

This ICS 722 then measures the IIC 723—as these are both machines with trusted components (even though both machines and trusted components are virtual), this can be done by obtaining relevant integrity metrics from the trust routine 753 of the IIC 723—and determines that it meets appropriate criteria. Logical criteria to employ would be that it is the only virtual machine that has access to input from the keyboard 14 that it owns and also that it will only send the keystrokes from the keyboard 14 to the IIC 723. It is possible that appropriate criteria may not simply need to be guaranteed by the IIC 723, but also by the computing platform itself (for example by integrity metrics provided by the trusted platform module device 72).

Once the ICS 722 has established that it can connect in trusted fashion with the IIC 723, it then communicates 1040 with the bank 2 over the network 19. It passes measurements of relevant aspects of the computing platform 3 to the bank 2 to enable the bank 2 to determine whether the ICS 722 in its computing environment should be allowed to authenticate a user. These measurements may comprise some or all of the integrity metrics received in the previous step, and may include an integrity metric of the ICS 722. Such measurements would typically indicate that all relevant communication paths were secure, and that the IIC 723 as well as the ICS 722 met standards required by the bank 2.

The bank 2 thus determines 1050 whether it accepts the ICS 722 and the associated computing environment(s) and communicates this to the ICS 722. If it does, then the ICS 722 conveys this information to the IIC 723 which prepares to accept secure user input—in practical implementations, the ICS 722 would typically also indicate progress to the relevant application in the GPC 721. In such a practical implementation, the user 1 is presented with a dialog box generated by the application in the GPC 721 on the display 18, and when this gains the focus, a message is sent by the application in the GPC 721 to the IIC 723 to tell it to direct input to the ICS 722 and not to the GPC 721. The IIC 723 communicates with the OIC 724 as the application in the GPC 721 gains and loses focus so that the OIC 724 displays the current status of input to the user 1—typically a part of the display of current status would include some text to inform user 1 that his keystrokes were being sent directly to the ICS 722 representing the bank 2.

Some predetermined mechanism is used to allow the user 1 to complete 1070 their trusted input. This could be simply by an appropriate keystroke (such as pressing the "Enter" key), which need only involve interaction between the IIC 723 and the ICS 722, or by interaction with the application running in the GPC 721 (for example, by pressing a "Done" box provided by the application), in which case communication would be needed from the GPC 721 to the IIC 723 to the ICS 722. The OIC 724 then displays the updated status—that the trusted input has been completed.

At this point, the ICS 722 has the secure user input and is ready to determine whether use can be made of the relevant user secrets. The ICS 722 may also at this time determine 1080 whether the application running in the GPC 721 is approved to access the online banking service provided by the bank 2—again, in this embodiment this may be done by requesting and inspecting an appropriate integrity metric from the trust routine 751 of the GPC 721.

The ICS 722 then evaluates the trusted user input against the relevant user secrets that it holds. As indicated above, this evaluation step can be carried out in different ways depending on the service to be performed by the ICS 722—in the present case, the trusted user input may represent a password, and if the ICS 722 matches this password against the or a password in its list of user passwords, it can then use authentication data (such as user credentials) associated in its list with that password to authenticate 1100 the user 1 to the bank 2.

The success of authentication is conveyed 1110 by the ICS 722 to the GPC 721 (either directly on successful authentication or after enquiry by the GPC 721). The ICS 722 at this point provides over a secure path 1120 a unique session ID to the GPC 721 so that the GPC 721 can prove to the bank 2 that it has been securely authenticated to it. Clearly the bank 2 needs to be able to recognise that the secure ID is valid—this could be done by the ICS 722 providing separate keys to both bank 2 and GPC 721 (the unique session ID being one of the keys), or by other cryptographic approaches well known to the person skilled in the art.

Figure 10B:
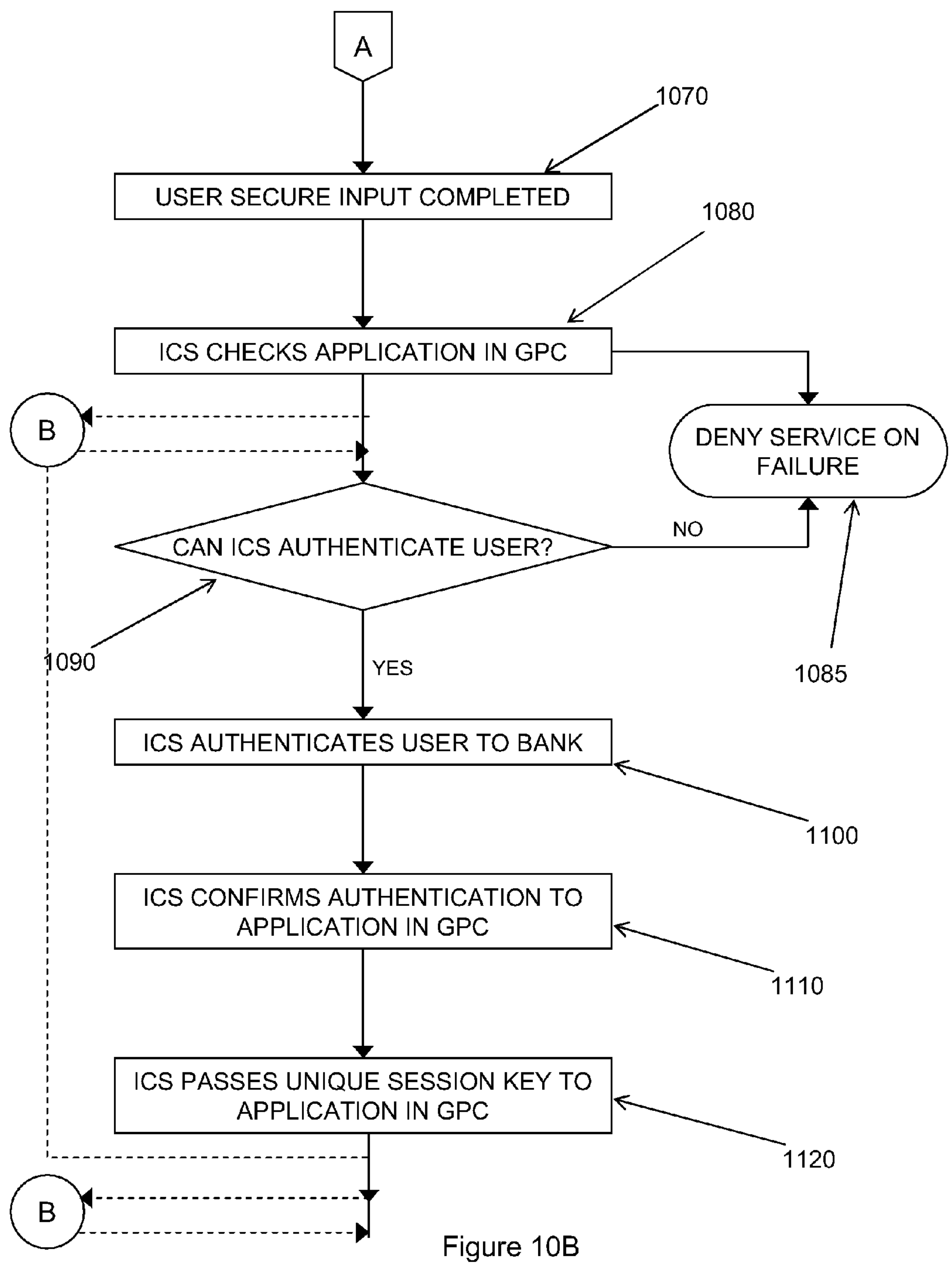
Figure 10C:
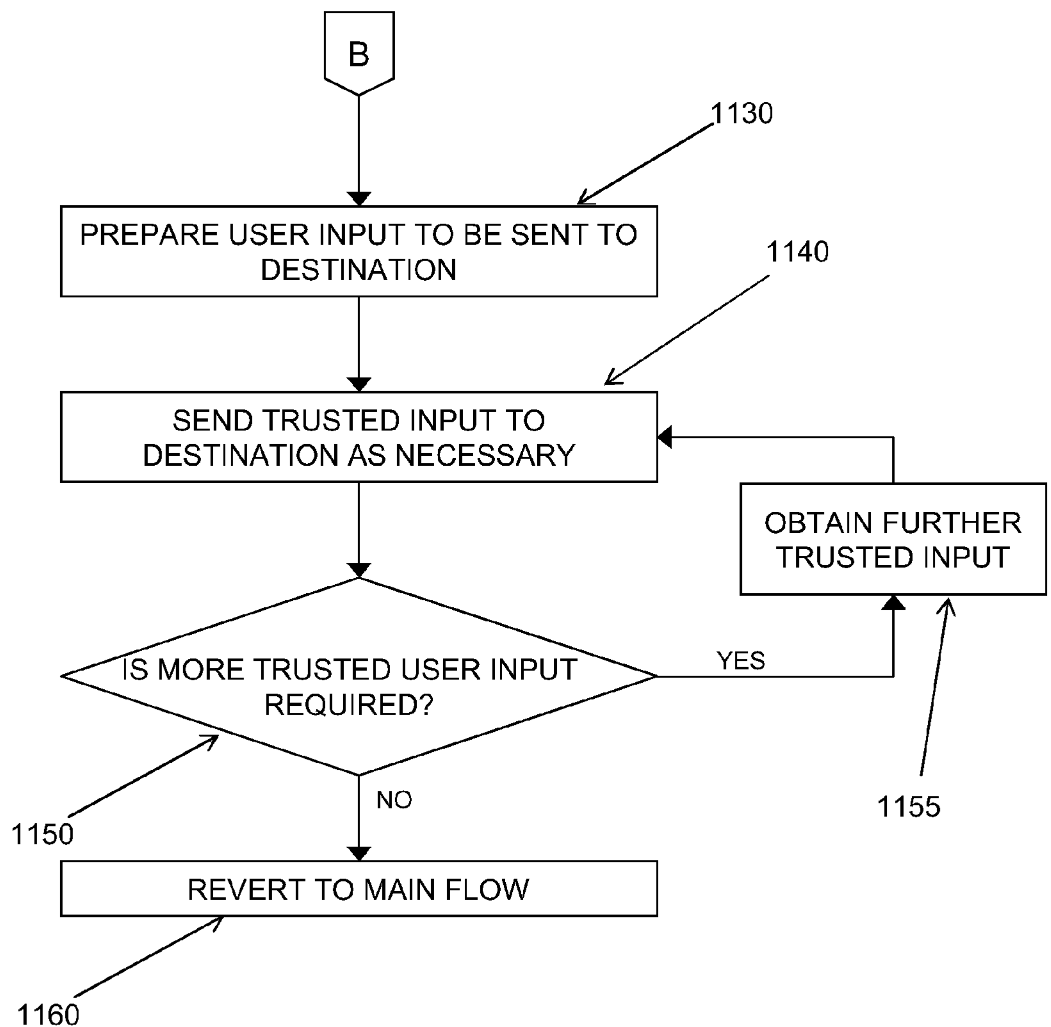

As indicated above, it is not necessarily the case that the only form of trusted user input consists of user secrets. Applications may also, or instead, need to establish that particular input can be trusted as coming from a specific authenticated user, or from the user physically present at the computing apparatus. This is represented by an additional loop shown at "B" in FIG. 10B, the steps in this additional loop being represented in FIG. 10C. Dashed lines in FIG. 10B show branching to the loop "B" at appropriate stages for production of such trusted user input, one variant showing that trusted user input may be provided instead of, rather than as well as, user input of user secrets. The first step 1130 shown is for any trusted input received that is to be provided to another component or other entity to be provided to that component or entity. In the case shown here, the or some of the trusted user input may need to be provided to the bank as well as used directly by the ICS (for example, some kind of digest of the user authentication information may be required by the bank, or the user may have entered additional data relevant to the transaction but not in itself authentication information, and this additional information may need to be forwarded to the bank). Some of the trusted user input may also need to be routed to the application in the GPC. The ICS determines which (if any) of the trusted user input needs to be so directed and in step 1140 sends it as required. The application in the GPC, or the bank, may in using this trusted user input determine that more trusted user input is required—this is checked by the ICS at step 1150—if so, this input is collected 1155 and routed 1140 as previously, whereas if not, the loop ends and processing returns to the main flow of control as shown in FIG. 10B.

It should be noted that the example provided above is simply an example of use of user secrets and other user input that should be or needs to be trusted according to embodiments of the invention. Such use may involve any conventional use of user secrets, such as for example: accessing a third party service; accessing encrypted or DRM-protected content locally or remotely held; or allowing the user access to privileged applications or resources. Such use may also involve providing user input to an application locally or remotely where it is necessary or desirable to have confidence that the input was provided directly by either a specific user or the user physically present at the computing platform. The skilled person will readily appreciate how the functional arrangements described for embodiments of the invention above may be adapted to any such use.

As can be seen above, embodiments of the invention can be deployed using specialised hardware, whereas other embodiments can be deployed using conventional hardware with appropriate software.

The invention claimed is:

1. A computing platform adapted for secure use of trusted user input, comprising:

a. a user input device;

b. a first isolated operating environment for execution of applications requiring use of trusted user input;

c. a second isolated operating environment adapted for secure processing of user input and information relating to a user; and d. a third isolated operating environment adapted for secure communication with the user input device, wherein no isolated operating environment can communicate with another isolated operating environment other than by a secure path therebetween, and when an application executing in the first isolated operating environment requires the user to provide trusted user input, the user provides user input through the user input device to the third isolated operating environment, the user input is provided to the second isolated operating environment, and the second isolated operating environment provides a service that uses the information relating to the user and the user input as required by the application executing in the first operating environment.

2. A computing platform as claimed in claim 1, wherein the trusted user input comprises a user secret, and wherein the service provided by the second isolated operating environment comprises authenticating the user by use of the user secret.

3. A computing platform as claimed in claim 1, wherein the trusted user input comprises input to be confirmed as originating from a user physically present at the computing platform, and wherein the service provided by the second isolated operating environment comprises confirming to the application executing in the first isolated operating environment or any other relevant computing entity that the trusted user input was provided by a user physically present at the computing platform.

4. A computing platform as claimed in claim 1, further comprising a fourth isolated operating environment adapted for secure communication with a user display device, wherein the fourth operating environment is adapted to provide display of information related to trusted user input such that the display can be trusted by the user.

5. A computing platform as claimed in claim 1, wherein the first computing environment comprises a secure switching application to control interaction with the other isolated computing environments.

6. A computing platform as claimed in claim 1, wherein each of the computing environments comprises a separate physical component.

7. A computing platform as claimed in claim 6, wherein each separate physical component is physically and logically resistant to tampering and is adapted reliably to provide and report measurements relating to its computing environment.

8. A computing platform as claimed in claim 1, wherein each of the computing environments consists of a virtual machine.

9. A computing platform as claimed in claim 8, wherein the computing platform further comprises a physical component physically and logically resistant to tampering and adapted reliably to provide and report measurements relating to that computing platform, and wherein one or more of the computing environments consisting of a virtual machine has a trust routine with trust rooted in the physical component and adapted reliably to provide and report measurements relating to that virtual machine.

10. A method for providing and using trusted user input on a computing platform, comprising the steps of:

a. instantiating in the computing platform an isolated operating environment for user information adapted for secure processing of information relating to a user;

b. the isolated operating environment for user information receiving a request for a service relating to use of trusted user input;

c. the isolated operating environment for user information establishing that trusted user input can safely be received from an isolated operating environment for input adapted to receive reliably and retain securely user input as provided by a user into a user input device;

d. the isolated operating environment for user information receiving the trusted user input securely from the isolated operating environment for input along a trusted path therebetween; and e. the isolated operating environment for user information using the trusted user input to provide the requested service relating to use of the trusted user input.

11. A method as claimed in claim 10, wherein the trusted user input comprises a user secret, and the service provided by the isolated operating environment for user information comprises authentication of the user by use of the trusted user input and secrets held by the isolated operating environment for user information.

12. A method as claimed in claim 10, wherein the trusted user input comprises input to be confirmed as originating from a user physically present at the computing platform, and wherein the service provided by the isolated operating environment for user information comprises confirming to any other relevant computing entity that the trusted user input was provided by a user physically present at the computing platform.

13. A method as claimed in claim 10, wherein the step of establishing that trusted user input can safely be received from the isolated operating environment for input comprises receiving and evaluating measurements of the isolated operating environment for input.

14. A method as claimed in claim 10, wherein the computing platform further comprises a main operating environment, and the request to the isolated operating environment for user information is provided by an application running in the main operating environment.

15. A method as claimed in claim 14, wherein the main operating environment is an isolated operating environment.

16. A method as claimed in claim 10, wherein the computing platform comprises an isolated operating environment for display adapted to provide output securely to a display device, the method further comprising the isolated operating environment for input providing information to the isolated operating environment for display over a secure path to indicate to the user when the user is providing the trusted user input.

17. A method as claimed in claim 10, wherein all the isolated operating environments are virtual machines, and wherein isolation and secure paths are established by a virtual machine monitor of the computing platform.

18. A method as claimed in claim 17, wherein the computing platform comprises a physical component physically and logically resistant to tampering and adapted reliably to provide and report measurements relating to that computing platform, and wherein at least one virtual machine has a trust routine with trust rooted in the physical component and adapted reliably to provide and report measurements relating to that virtual machine.

19. A method as claimed in claim 10, wherein the isolated component for user information is providing the service on behalf of a remote entity, and further comprising the isolated component for secrets providing evidence to the remote entity that it is adapted to provide the service securely.

* * * * *

CERTIFICATE OF CORRECTION

PATENT NO. : 8,332,930 B2
APPLICATION NO. : 12/374734
DATED : December 11, 2012
INVENTOR(S) : Will Burton et al.

It is certified that error appears in the above-identified patent and that said Letters Patent is hereby corrected as shown below:

Title page, Item (75), Inventors, in column 1, line 1, delete "Wili Burton," and insert -- Will Burton, --, therefor.

Signed and Sealed this
Twelfth Day of March, 2013

Teresa Stanek Rea
*Acting Director of the United States Patent and Trademark Office*